United States Patent
Kunze et al.

(10) Patent No.: US 7,498,015 B1
(45) Date of Patent: Mar. 3, 2009

(54) METHOD OF MAKING SILANE COMPOSITIONS

(75) Inventors: Klaus Kunze, Half Moon Bay, CA (US); Wenzhuo Guo, Cupertino, CA (US); Fabio Zurcher, Brisbane, CA (US); Mao Ito, Cupertino, CA (US); Laila Francisco, El Dorado Hills, CA (US); Joerg Rockenberger, Redwood City, CA (US); Brent Ridley, San Carlos, CA (US)

(73) Assignee: Kovio, Inc., Milpitas, CA (US)

( * ) Notice: Subject to any disclaimer, the term of this patent is extended or adjusted under 35 U.S.C. 154(b) by 969 days.

(21) Appl. No.: 10/789,317

(22) Filed: Feb. 27, 2004

(51) Int. Cl.
*C01B 6/00* (2006.01)
(52) U.S. Cl. ...................... 423/645; 423/326
(58) Field of Classification Search ................ 423/327, 423/645
See application file for complete search history.

(56) References Cited

U.S. PATENT DOCUMENTS

| | | | |
|---|---|---|---|
| 4,052,430 A | 10/1977 | Yajima et al. | |
| 4,276,424 A | 6/1981 | Peterson, Jr. et al. | |
| 4,537,942 A | 8/1985 | Brown-Wensley et al. | |
| 4,554,180 A | 11/1985 | Hirooka | |
| 4,611,035 A | 9/1986 | Brown-Wensley et al. | |
| 4,683,145 A | 7/1987 | Nishimura et al. | |
| 4,683,146 A | 7/1987 | Hirai et al. | |
| 4,704,444 A | 11/1987 | Brown-Wensley et al. | |
| 4,726,963 A | 2/1988 | Ishihara et al. | |
| 4,759,947 A | 7/1988 | Ishihara et al. | |
| 4,820,788 A | 4/1989 | Zeigler | |
| 4,830,890 A | 5/1989 | Kanai | |
| 4,835,005 A | 5/1989 | Hirooka et al. | |
| 4,841,083 A | 6/1989 | Nagai et al. | |
| 4,992,520 A | 2/1991 | Zeigler | |
| 5,866,471 A | 2/1999 | Beppu et al. | |
| 5,942,637 A | 8/1999 | Boudjouk et al. | |
| 6,503,570 B2 * | 1/2003 | Matsuki et al. | 427/387 |
| 6,514,801 B1 | 2/2003 | Yudasaka et al. | |
| 6,518,087 B1 | 2/2003 | Furusawa et al. | |
| 6,527,847 B1 | 3/2003 | Matsuki | |
| 6,541,354 B1 | 4/2003 | Shimoda et al. | |
| 6,884,700 B2 | 4/2005 | Aoki et al. | |
| 2003/0045632 A1 | 3/2003 | Shiho et al. | |
| 2003/0087110 A1 | 5/2003 | Furusawa et al. | |
| 2003/0148024 A1 | 8/2003 | Kodas et al. | |
| 2003/0229190 A1 | 12/2003 | Aoki et al. | |

FOREIGN PATENT DOCUMENTS

| | | |
|---|---|---|
| EP | 1 085 560 A1 | 3/2001 |
| EP | 1 085 579 A1 | 3/2001 |
| EP | 1 087 428 A1 | 3/2001 |
| EP | 1 087 433 A1 | 3/2001 |
| EP | 1 113 502 A1 | 7/2001 |
| EP | 0 902 030 B1 | 10/2002 |
| GB | 2077710 B | 10/1983 |
| JP | 60-242612 | 12/1985 |
| JP | 60242612 A | 12/1985 |
| JP | 6-191821 | 7/1994 |
| JP | 7-267621 | 10/1995 |
| JP | 9-45922 | 2/1997 |
| JP | 11171528 A | 6/1999 |
| JP | 2000031066 A | 1/2000 |
| WO | WO 00/59014 | 3/2000 |

OTHER PUBLICATIONS

Yutaka Kitsuno, Kotaro Yano, Akira Sakawaki and Koiji Kawasaki; Method for Forming Poly Crystal Silicon Film; Patent Abstracts of Japan; Feb. 14, 1997; Publication No. 09045922 A; Japanese Patent Office, Japan.

Kotaro Yano, Yutaka Kitsuno, Akira Sakawaki and Keiji Kawasaki; Formation of Silicon Membrane; Patent Abstracts of Japan; Oct. 17, 1995; Publication No. 07267621 A; Japanese Patent Office, Japan.

Kotaro Yano, Yutaka Kitsuno, Shoichi Tazawa and Keiji Kawasaki; Higher Order Silana Containing Solution for Forming Silicon Film; Patent Abstracts of Japan; Jul. 12, 1994; Publication No. 06191821 A; Japanese Patent Office, Japan.

Yukio Nishimura, Hiroshi Matsuda, Masahiro Haruta, Yutaka Hirai, Takeshi Eguchi and Takashi Katagiri; Deposition Film Forming Method; Patent Abstracts of Japan; Dec. 2, 1985; Publication No. 60242612 A; Japanese Patent Office, Japan.

* cited by examiner

*Primary Examiner*—Edward M Johnson
(74) *Attorney, Agent, or Firm*—Andrew D. Fortney

(57) ABSTRACT

A method of making hydrogenated Group IVA compounds having reduced metal-based impurities, compositions and inks including such Group IVA compounds, and methods for forming a semiconductor thin film. Thin semiconducting films prepared according to the present invention generally exhibit improved conductivity, film morphology and/or carrier mobility relative to an otherwise identical structure made by an identical process, but without the washing step. In addition, the properties of the present thin film are generally more predictable than those of films produced from similarly prepared (cyclo)silanes that have not been washed according to the present invention. The present invention advantageously provides semiconducting thin film structures having qualities suitable for use in electronics applications, such as display devices or RF ID tags, while enabling high-throughput manufacturing processes that form such thin films in seconds or minutes, rather than hours or days as with conventional photolithographic processes.

75 Claims, No Drawings

METHOD OF MAKING SILANE COMPOSITIONS

RELATED APPLICATION(S)

The present application may be related to U.S. application Ser. No. 10/616,147, filed Jul. 8, 2003 and entitled "Compositions and Methods for Forming a Semiconducting and/or Silicon-Containing Film, and Structures Formed Therefrom", which is incorporated herein by reference in its entirety.

FIELD OF THE INVENTION

The present invention generally relates to the field of silane compositions. More specifically, embodiments of the present invention pertain to methods of forming cyclosilane compounds that are generally liquid at ambient temperatures, compositions including such cyclosilane compounds, methods for forming a semiconductor and/or semiconducting thin film from such cyclosilane compositions, and structures including such a film.

DISCUSSION OF THE BACKGROUND

Silane compounds are conveniently produced by reduction of chlorosilanes with Al-containing reducing agents (e.g., lithium aluminum hydride [$LiAlH_4$], or LAH). The silanes obtained after purification via recondensing or vacuum distillation oftentimes contain an appreciable amount of aluminum compounds. Without intending to be bound by any particular theory, it is believed that the aluminum compounds present in such recondensed or vacuum distilled silanes adversely affect the electrical properties of thin films made from such silanes (e.g., resistivity), and may adversely affect the physical properties of compositions including such silane(s) (e.g., the ability to form a uniform thin layer during spin coating).

Furthermore, there is a long-felt need for a "liquid silicon" composition. Such a composition would primarily comprise silicon, would be in the liquid phase at ambient temperatures (to facilitate handling, deposition and further processing), and would yield commercial quality semiconducting films upon subsequent heating (e.g., annealing or curing). Better yet, the "liquid silicon" composition would be patternable without conventional photolithography (i.e., without depositing conventional photoresist materials).

SUMMARY OF THE INVENTION

This invention is directed towards the preparation of hydrogenated Group IVA compounds (e.g., silanes) with reduced metal impurities (e.g., lithium, sodium, aluminum, etc.). The present invention is directed towards successfully removing aluminum impurities from silanes via a washing step (e.g., with deionized water, dilute acid or other aqueous or polar immiscible washing agent). This washing step may also reduce the amount of lithium, sodium and/or other metal-based impurities that are soluble in the polar phase. Thus, the invention concerns a method of making a hydrogenated Group IVA compound, comprising the steps of (i) reacting a reducible Group IVA compound of the formula $A_xX_y$ with a metal hydride (e.g., a compound of the formula $M^1{}_aM^2{}_bH_cR_d$) to form a metal-contaminated, hydrogenated Group IVA compound; and (ii) washing the metal-contaminated, hydrogenated Group IVA compound with a washing composition comprising an immiscible polar solvent to decontaminate the metal-contaminated, hydrogenated Group IVA compound (e.g., sufficiently to remove a substantial amount of the metal contaminants). In further aspects, the invention concerns a composition comprising one or more (cyclic) Group IVA compounds having less than a particular amount of certain impurities, a method of forming a semiconducting thin film from such a composition, and a thin film structure formed by such a method.

The present invention enables (1) the formation of silicon thin films with significantly reduced Al and/or alkali metal (e.g., Li) impurities, (2) improved stability of an ink containing the present silane composition, and (3) an improved silane deposition process. The present invention further advantageously provides thin film structures having improved physical and/or electrical properties (e.g., film roughness, conductivity, density, adhesion and/or carrier mobility), relative to structures made from an otherwise identical process without the washing step and/or containing a greater proportion of metal impurities. In addition, the properties of the thin films are generally more predictable than those of films produced from similarly prepared (cyclo)silanes, but that have not been washed according to the present invention. These and other advantages of the present invention will become readily apparent from the detailed description of preferred embodiments below.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. For example, the term "(cyclo)silane" as used herein generally refers to a compound that may contain one or more cyclic rings and that consists essentially of (1) a chain or framework of covalently bound silicon and/or germanium atoms, and (2) hydrogen and/or deuterium atoms bound thereto. In addition, the term "decontaminate" means to remove some, a measurable or significant amount, or substantially all of a contaminant from a composition, and the term "(hydrogenated) elemental material" refers to a material that consists essentially of atoms in an elemental state bound to each other (e.g., silicon and/or germanium in essentially an oxidation state of zero), but which may also include hydrogen atoms nonstoichiometrically, in less than a 1:1 atomic ratio (e.g., to cap or covalently bind so-called "dangling bonds" in the elemental material). However, it will be readily apparent to one skilled in the art that the present invention may be practiced without these specific details. In other instances, well-known methods, procedures, components, and circuits have not been described in detail so as not to unnecessarily obscure aspects of the present invention.

The present invention concerns a method of making hydrogenated Group IVA compounds (e.g., silanes), comprising the steps of (i) reacting a reducible Group IVA compound with a metal hydride to form a metal-contaminated, hydrogenated Group IVA compound (i.e., having one or more metal contaminants); and (ii) washing the metal-contaminated, hydrogenated Group IVA compound with a washing composition comprising an immiscible polar solvent to decontaminate the metal-contaminated, hydrogenated Group IVA compound.

Further aspects of the invention concern (1) a composition comprising one or more cyclic Group IVA compounds of the formula $(AH_z)_n$, where n is from 3 to 12, each A is independently Si or Ge, each of the n instances of z is independently 1 or 2, and the composition contains less than 100 ppm of aluminum with respect to A atoms in the Group IVA compound; (2) an ink for printing a semiconductor and/or semiconducting thin film, including the inventive composition described herein and a solvent in which the composition is soluble; and (3) a method of making a semiconducting film, comprising the steps of depositing the present composition or ink on a substrate and curing the composition to form the semiconducting film. Curing is generally conducted under conditions sufficient to form a doped or undoped polysilane, polygermane or germanium-substituted polysilane having a molecular weight sufficiently high and/or a chemical composition sufficiently insoluble to resist subsequent treatment with processing solvents (e.g., in subsequent cleaning and/or development steps).

A still further aspect of the invention relates to a semiconducting thin film structure comprising an at least partially hydrogenated, at least partially amorphous Group IVA element, the Group IVA element comprising at least one of silicon and germanium, the semiconducting material having less than 100 ppm of aluminum with respect to Group IVA atoms in the thin film structure. In preferred embodiments, the structure may be formed by the present method as described herein.

The invention, in its various aspects, will be explained in greater detail below with regard to exemplary embodiments.

Exemplary Methods of Making a Hydrogenated Group IVA Compound

The present invention relates to a method of making hydrogenated Group IVA compounds (e.g., silanes), comprising the steps of (i) reacting one or more reducible (e.g., halogenated and/or alkoxylated) Group IVA compounds with a metal hydride to form a metal-contaminated, hydrogenated Group IVA compound; and (ii) washing the metal-contaminated, hydrogenated Group IVA compound with a washing composition comprising an immiscible polar solvent to decontaminate the metal-contaminated, hydrogenated Group IVA compound. In various embodiments, the halogenated and/or alkoxylated Group IVA compounds comprise or consist essentially of compound(s) of the formula $A_xX_y$, where each A is independently Si or Ge, each X is independently a halogen or an alkoxy group (e.g., a $C_1$-$C_6$ alkoxy group, a $C_1$-$C_4$ alkoxy-$C_2$-$C_6$ alkyleneoxy group, a $C_6$-$C_{12}$ aryloxy group or a $C_6$-$C_{10}$ aryl-$C_1$-$C_4$ alkyleneoxy group), x is from 3 to 12, and y is from x to (2x+2); the metal hydride comprises a compound of the formula $M^1_aM^2_bH_cR_d$, where $M^1$ and $M^2$ are independently first and second metals, each R in the metal hydride compound is independently a ligand bound to at least one of $M^1$ and $M^2$ by a covalent, ionic or coordination bond, at least one of a and b is at least 1, c is at least 1, and d is 0 or any integer up to one less than the number of ligand binding sites available on the (a+b) instances of $M^1$ and $M^2$; and/or the metal-contaminated Group IVA compound is washed with the washing composition sufficiently to remove a substantial amount of the metal contaminants. In certain implementations, x and y are selected such that the Group IVA compound(s) and/or hydrogenated Group IVA compound are liquid at ambient temperatures (e.g., from 15° C. to 30° C.). In other embodiments, $M^1$ is at least one alkali and/or alkaline earth metal and $M^2$ is at least one of the transition metals and/or a Group IIIA (or Group 13) element selected from the group consisting of boron, aluminum, gallium, and indium.

Where X in the compound of the formula $A_xX_y$ is a $C_1$-$C_6$ alkoxy group, a $C_1$-$C_4$ alkoxy-$C_2$-$C_6$ alkyleneoxy group, a $C_6$-$C_{12}$ aryloxy group or a $C_6$-$C_{10}$ aryl-$C_1$-$C_4$ alkyleneoxy group, X may be methoxy, ethoxy, n-propoxy, isopropoxy, n-butoxy, s-butoxy, t-butoxy, n-hexyloxy, s-hexyloxy, t-hexyloxy (e.g., —OCH$_2$CH$_2$C[CH$_3$]$_3$), methoxyethoxy, ethoxyethoxy, propoxyethoxy, methoxypropoxy, ethoxypropoxy, butoxybutoxy, phenoxy (—OC$_6$H$_5$), cresyl (—OC$_6$H$_4$CH$_3$), benzyloxy, etc. Alternatively, two X groups in the compound of the formula $A_xX_y$ may form a $C_2$-$C_6$ alkylenedioxy group, such as ethylenedioxy (—OCH$_2$CH$_2$O—) or propylenedioxy (—OCH$_2$CH$_2$CH$_2$O—), or an ortho-arylenedioxy group, such as o-(—O—)$_2$C$_6$H$_4$. However, in preferred embodiments, X is a halogen, such as chloride or bromide (more preferably Cl).

More specifically, the method relates to a metal hydride reduction of a perhalo(cyclo)silane of the formula $Si_xX_y$ to form a corresponding (cyclo)silane of the formula $Si_xH_y$, where the (cyclo)silane is subsequently purified by washing (e.g., with an aqueous washing composition). The present washing step is believed to be novel and to be responsible for the observed reductions in metal impurities. In various embodiments, the washing composition comprises or consists essentially of a polar organic solvent that is immiscible with the silane composition (e.g. acetonitrile), deionized water, a saline solution (e.g., brine), or a dilute aqueous acid. In a preferred implementation, the washing composition consists essentially of deionized water.

However, in various alternative embodiments, the washing composition comprises dilute acid, which (i) has a pH of from 1 to less than 7 (and thus comprises a dilute aqueous acid), (ii) may further comprise a buffer (e.g., the composition comprises a buffered aqueous acid), and/or (iii) is selected from the group consisting of dilute aqueous HCl, dilute aqueous HBr, dilute aqueous HI, etc. Buffers, when employed, may include alkaline metal, alkaline earth and ammonium salts of the corresponding acid used in a dilute acid composition. For example, the buffered aqueous acid may comprise dilute aqueous acetic acid buffered with ammonium acetate and/or an alkali metal acetate salt. Buffers may also include conventional buffers such as conventional sodium and/or potassium phosphate, oxalate and/or tartrate salt buffers. Alkaline solutions (e.g., having a pH of >9) are generally avoided, as such solutions may initiate and/or promote oligomerization, polymerization and/or rearrangement of the (cyclo)silane.

The relative proportions of the contaminated hydrogenated Group IVA compound and the washing composition may be any that effectively remove metal contaminants from the hydrogenated Group IVA compound. For example, the washing composition and the hydrogenated Group IVA compound may be present in a volume ratio of from 10:1 to 1:10 (not including any relatively non-polar organic solvent or other component that may be present in or with the hydrogenated Group IVA compound), from 5:1 to 1:5, or from 3:1 to 1:1.

The present method may further comprise the step of purifying the (metal-contaminated) hydrogenated Group IVA compound, either before or after the washing step. Such purifying typically comprises distilling the hydrogenated Group IVA compound, optionally under reduced pressure (e.g., from 0.1 to 50 Torr) and/or at ambient temperature or higher (e.g., from about 15° C. to about 90° C., or from about 20° C. to about 60° C.). For example, typical conditions for distilling cyclo-Si$_5$H$_{10}$ include a temperature of about 25° C. and a pressure of about 0.5 Torr.

Prior to the present washing step, the (cyclo)silane may include metal contaminants of up to 0.1-0.2 atom % or more (with respect to silicon and/or germanium atoms in the (cyclo)silane), particularly where the (cyclo)silane is synthesized using aluminum compounds (see the discussion below). However, after the present washing step, the metal contaminant(s) are typically present in a concentration or amount of less than 100 parts per million Group IVA atoms in the (cyclo)silane, preferably less than 10 parts per million Group IVA atoms, and more preferably less than 1 part per million Group IVA atoms. Thus the present washing step is capable of reducing metal contamination (and particularly aluminum contamination) in the hydrogenated Group IVA compound by 2, 3, 4, or more orders of magnitude.

In one example, after distillation or recondensation from a hydro-dehalogenation reaction mixture, the (cyclo)silane or (cyclo)silane mixture is washed with deionized water of pH=7 for a length of time of from about 1 to about 5 minutes. The volume ratio of deionized water to silane(s) is from about 5:1 to about 1:2. After separation of the silane phase and drying over molecular sieves (4 Å) for a length of time of from about 0.1 minutes to about 1 hour, the (cyclo)silane phase is further applied as an ink onto a substrate. The Al content was measured. Compared to a film obtained from an otherwise essentially identical, but unwashed, (cyclo)silane batch, the Al content decreased by about 4 orders of magnitude (from about 0.1 at. % to about 100 ppb), as determined by secondary ion mass spectroscopy (SIMS).

In a further aspect, the method further comprises the step of drying the hydrogenated Group IVA compound, after the washing step. Typically, drying comprises contacting the hydrogenated Group IVA compound with a drying agent or desiccant, such as molecular sieves, anhydrous sodium or magnesium sulfate, anhydrous silica, etc., or exposing the hydrogenated Group IVA compound to a drying agent or desiccant, such as $CaCl_2$, $CaSO_4$ or perhaps even $P_2O_5$ that is physically separated from the hydrogenated Group IVA compound (for example by placing the drying agent in one section of a two-walled flask or container and the hydrogenated Group IVA compound in the other section, then sealing the flask or container and optionally purging the atmosphere to put the drying agent and hydrogenated Group IVA compound under a vacuum or an inert atmosphere).

The compound of the formula $A_xX_y$ may be any straight-chain, branched, cyclic or polycyclic silane, germane, germasilane or silagermane useful for making hydrogenated silanes for thin semiconductor films. However, in preferred embodiments, the compound of the formula $A_xX_y$ comprises a cyclic or polycyclic perhalosilane or perhalogermasilane. Thus, the resulting (cyclo)silane preferably comprises a cyclic Group IVA compound of the formula $(AH_z)_n$, where n is from 3 to 12, and each of the n instances of z is independently 1 or 2, and in one embodiment, A is Si, n is from 4 to 8, and z is 2. Thus, the perhalosilane may be selected such that it yields such a cyclosilane (or mixture of such cyclosilanes) upon hydro-dehalogenation. In one implementation, the (cyclo)silane comprises a mixture of compounds of the formula $(AH_z)_n$, where the majority (i.e., >50 mol %) of the (cyclo)silane composition consists of $(SiH_2)_5$, accompanied by smaller molar proportions (e.g., $\leq$20 mol % each) of $(SiH_2)_6$, $(SiH_2)_7$ and/or $(SiH_2)_8$. In various examples, the (cyclo)silane composition comprises >80 mol % (preferably >90 mol %) of $(SiH_2)_5$, and from 0.1 to 10 mol % each (preferably from 0.5 to 5 mol %) of $(SiH_2)_6$, $(SiH_2)_7$ and/or $(SiH_2)_8$. Typically, small amounts (e.g., <10 mol %, preferably <5 mol %, more preferably <3 mol %) of n-silanes and/or iso-silanes of the formula $Si_nH_{n+2}$ are present in such a mixture, where n is from 4 to 10 in such n-silanes and iso-silanes. The (cyclo)silane composition may further contain one or more high molecular weight silanes having, e.g., 60 or more silicon atoms therein. Such higher molecular weight silanes, which may form in a greater amount or proportion the longer the present washing and/or drying steps are conducted, tend to increase the viscosity of the (cyclo)silane composition, thereby improving its properties for certain applications (e.g., inkjetting, spin coating, curing, etc.).

Of course, the present method also comprises a metal hydride reduction (or hydrodehalogenation) of a reducible (cyclo)perhalosilane (e.g., of the formula $A_xX_y$) to form the hydrogenated Group IVA compound (e.g., of the formula $(AH_z)_n$). Generally, the metal hydride is added to a solution of $A_xX_y$ at a temperature of from −78° C. to about 200° C. (preferably from about −20° C. to about 100° C., more preferably from about −10° C. to about 30° C.), depending on the solvent and the reactivities of the $A_xX_y$ compound(s) and the metal hydride, then the reaction mixture is stirred until the reaction is substantially complete. In various embodiments (except where the metal hydride is generated in situ using a catalytic amount of a metal hydride precursor), a solution of the metal hydride may be added to a solution of $A_xX_y$ over a period of time of from 1 minute to 10 hours, 5 minutes to 4 hours, or 10 minutes to 2 hours, and/or at a rate of from 1 to 100 mmol of metal hydride/minute, 3 to 50 mmol/minute, or 5 to 25 mmol/minute. In one implementation (on a scale of about 10 grams of [cyclo]silane), a solution of metal hydride is added over about an hour at a rate of about 8-10 mmol/minute. The reaction may be monitored (e.g., by infrared or FT-IR spectroscopy, gas phase chromatography, $^1H$ or $^{29}Si$ NMR spectroscopy, etc.), and if necessary and/or desired, warmed (e.g., from $\leq$0° C. to ambient temperature, or from ambient temperature to 50-100° C., etc.) until the reaction is complete. This total reaction time may be from 10 minutes to 2 days, 1 to 24 hours, or 4 to 16 hours. The molar ratio of hydrogen atoms in the metal hydride to X groups (e.g., halogen atoms) in the (cyclo)silane can be from 5:1 to about 1:1, and is preferably about 2:1 (e.g., from about 1.9:1 to about 2.1:1).

Exemplary solvents for the metal hydride reduction reaction include alkanes (e.g., $C_5$-$C_{12}$ branched or unbranched alkanes and cycloalkanes), fluorinated alkanes (e.g., $C_3$-$C_8$ alkanes having from 1 to 2n+2 fluorine substituents and $C_3$-$C_6$ cycloalkanes having from 1 to 2n fluorine substituents, where n is the number of carbon atoms), arenes (e.g., benzene), substituted arenes (e.g., N-methylpyrrole or $C_6$-$C_{10}$ arenes having from 1 to 8 fluorine substituents and/or $C_1$-$C_4$ alkyl and/or alkoxy substituents; preferably benzenes having from 1 to 6 fluorine, $C_1$-$C_2$ alkyl and/or methoxy substituents), aliphatic ethers (e.g., ethers having two $C_2$-$C_6$ branched or unbranched alkyl groups, or 1 methyl group and one $C_4$-$C_6$ branched or unbranched alkyl group), cyclic ethers (e.g., tetrahydrofuran or dioxane), and glycol ethers (e.g., of the formula $(CH_3(CH_2)_w)O((CH_2)_xO)_y(CH_2)_zCH_3)$, where x is independently 2-4 [preferably 2], y is 1-4 [preferably 1 or 2], and w and z are independently 0 to 3 [preferably 0]). The solvent selected for dissolving the perhalo(cyclo)silane compound(s) may be the same as or different from the solvent selected for dissolving the metal hydride. A preferred solvent for dissolving the perhalo(cyclo)silane compound(s) is cyclohexane, and a preferred solvent for dissolving the metal hydride is diethyl ether.

In the perhalo(cyclo)silane compound subject to metal hydride reduction where X is a halogen, X may be selected from the group consisting of Cl, Br and I, but is preferably Cl. Also, the perhalo(cyclo)silane compound of the formula $A_xX_y$ may comprise a mixture of perhalo(cyclo)silanes of the formula $(AX_{z'})_{n'}$, where n' and z' are as described above for n and z, but which are independent for each compound in the mixture. In one example, the perhalo(cyclo)silane comprises a mixture of compounds of the formula $(SiX_2)_n$, where the predominant portion (i.e., >80 mol %) of the perhalo(cyclo) silane composition consists of $(SiX_2)_5$, accompanied by a smaller molar proportion (e.g., from 0.5 to 10 mol %) of $(SiX_2)_4$ and, typically, an even smaller molar proportion (e.g., from 0 to <10 mol %) of $(SiX_2)_6$. Thus, in one embodiment, A is Si, x is from 4 to 6, and y is from 8 to 12.

The metal hydride used to reduce the halogenated or alkoxylated (cyclo)silane compound may comprise a compound of the formula $M^1_aM^2_bH_cR_d$. In certain embodiments, d is 0, and the metal hydride comprises a compound of the formula $M^1_aM^2_bH_c$; or a is 0, and the metal hydride comprises a compound of the formula $M^2_bH_cR_d$. In some embodiments, $M^1$ may comprise an alkali or alkaline earth metal, $M^2$ comprises one or more members selected from the group consisting of transition metals and Group IIIA elements, and a and b are each an integer of at least one. In such embodiments, the alkali metal may be selected from the group consisting of lithium, sodium, potassium, rubidium and cesium (preferably lithium, sodium and potassium); the alkaline earth metal may be selected from the group consisting of beryllium, magnesium, calcium, strontium and barium (preferably magnesium and calcium); the transition metal may be selected from the group consisting of yttrium, lanthanum, titanium, zirconium, vanadium, niobium, tantalum, chromium, molybdenum, tungsten, manganese, rhenium, iron, ruthenium, osmium, cobalt, rhodium, iridium, nickel, palladium and platinum (preferably titanium, zirconium, niobium, chromium, molybdenum, tungsten, rhenium, ruthenium, osmium, rhodium, iridium, palladium and platinum); and the Group IIIA element may be selected from the group consisting of boron, aluminum, gallium and indium (preferably aluminum). In some embodiments, the Group IIIA element may include aluminum and boron (e.g., an aluminoborohydride).

Examples of suitable metal hydrides of the formula $M^1_aM^2_bH_c$ include lithium aluminum hydride, calcium aluminum hydride, and (possibly) sodium borohydride. Examples of suitable metal hydrides of the formula $M^2_bH_cR_c$ include dialkylaluminum hydrides such as diisobutylaluminum hydride (DIBAL). In such compounds (I.e., in which d is at least 1), R may be an alkyl group (e.g., a straight-chain or branched $C_1$-$C_6$ alkyl group), an alkoxy group (e.g., a straight-chain or branched $C_1$-$C_6$ alkoxy group), an alkoxyalkylene group (e.g., a straight-chain or branched $C_1$-$C_4$ alkyl-$C_1$-$C_6$ alkylene group), an alkoxyalkyleneoxy group (e.g., a straight-chain or branched $C_1$-$C_4$ alkoxy-$C_1$-$C_6$ alkylene group), a cyano group, etc. Examples of suitable metal hydrides of the formula $M^2_bH_c$ include aluminum hydride, gallium hydride, and aluminum borohydride ($AlB_3H_{12}$). A suitable metal hydride of the formula $M^1_aM^2_bH_cR_d$ is sodium dihydrido-bis-(2-methoxyethoxy)aluminate. Thus, in various embodiments, (i) $M^2$ comprises a member selected from the group consisting of transition metals and Group IIIA elements (as described above), a is 0 or 1, d is at least 1, and R is an alkyl group, an alkoxy group, an alkoxyalkylene group, an alkoxyalkyleneoxy group or a cyano group (preferably $M^2$ comprises aluminum, R is a $C_1$-$C_6$ alkyl group, and c and d are integers having a ratio of from 1:2 to 2:1); or (ii) a is 1 and $M^1$ comprises an alkali metal, each R is independently a $C_1$-$C_6$ alkyl group, a $C_1$-$C_6$ alkoxy group, a $C_1$-$C_4$ alkyl-$C_1$-$C_6$ alkylene group, a $C_1$-$C_4$ alkoxy-$C_1$-$C_6$ alkylene group or a $C_1$-$C_4$ alkoxy-$C_1$-$C_6$ alkyleneoxy group, and c and d are integers having a ratio of from 1:3 to 3:1.

Alternatively, the metal hydride may be generated or created in situ during catalytic hydro-dehalogenation using a transition metal catalyst. In such a case, the transition metal may be selected from those described above, and R may be selected from monodentate ligands (e.g., a trialkyl amine such as trimethyl or triethyl amine, a trialkyl phosphine such as trimethyl or triethyl phosphine, a triaryl phosphine such as triphenyl phosphine, CO, pyridine, CN, a halogen such as Cl, OH, an oxo group [=O], etc.), bidentate ligands (e.g., diethers such as dimethoxyethane, diamines such as 1,2-bis(dimethylamino)ethane or bipyridine, etc.), and polydentate ligands (such as cyclopentadienyl, pentamethylcyclopentadienyl, benzene, etc.). Typically, such catalytic hydro-dehalogenation are performed under a medium to high pressure of hydrogen gas (e.g., from a few atm to many tens of atm; e.g., from 3 to 100 atm, or from 5 to 50 atm), and at a temperature of from ambient temperature (e.g., from about 15° C. to about 30° C.) to several hundred degrees (e.g., up to 100° C., 150° C., or 200° C.).

The halogenated and/or alkoxylated (cyclo)silane compound or composition may be synthesized by reducing and oligomerizing a compound of the formula $AR'_2X_2$ (where R' is, e.g., aryl [such as phenyl or tolyl] or alkyl [such as methyl, ethyl, propyl, isopropyl, n-butyl, s-butyl, t-butyl, cyclohexyl, etc.), followed by treating the reduced and oligomerized compound with a mixture of a Lewis acid and a hydrogen halide, such as $AlCl_3$ and HCl gas (e.g., when R' is aryl) or $SbX_5$-based systems (e.g., when R' is alkyl), to form a corresponding Group IVA halide compound. However, a more preferred synthetic route comprises (a) reducing and oligomerizing a compound of the formula $AR'_2X_2$, then (b) in one reaction vessel, first (i) treating the reduced and oligomerized compound of the formula $A_xR'_{y'}$ with a mixture of a Lewis acid and a hydrogen halide to form a corresponding Group IVA halide compound, then (ii) reacting the Group IVA halide compound with a metal hydride to produce the hydrogenated Group IVA compound (e.g., of the formula $(AH_z)_n$). Alternatively, the reduced and oligomerized compound of the formula $A_xR'_{y'}$ (e.g., perphenylpentasilane) may be reacted with HX (e.g., HBr) under high pressure (e.g., in a Parr vessel) without using any catalyst to form the Group IVA halide compound.

Thus, the present method may further comprise the step of reacting a compound of the formula $A_xR'_{y'}$ (e.g., $A_xAr_{y'}$, where Ar is aryl as described above and x' and y' are as described above for x and y, respectively, but which may be the same as or different from x and y, respectively) with HX (in this case, where X is a halogen) and a Lewis acid compound of the formula $M^3_pX_q$ to form a perhalo(cyclo)silane (e.g., the compound of the formula $A_xX_y$). In various embodiments, Ar is an aryl group which may be substituted with alkyl (e.g., straight-chain or branched $C_1$-$C_6$ alkyl groups), alkoxy (e.g., straight-chain or branched $C_1$-$C_6$ alkoxy groups), aryl (e.g., $C_6$-$C_{10}$ aryl groups), aralkyl (where the aryl and alkyl constituents may be as described herein), halogen, dialkylamino (where the alkyl constituents may be as described herein) and/or nitro groups; $M^3$ comprises a member selected from the group consisting of transition metals and Group IIIA elements (as described above); p is 1 or 2; and/or q is any integer up to the number of ligand binding sites available on the p instances of $M^3$. In preferred embodiments, x' is from 3 to 12, preferably from 4 to 6; y' is 2*x'; A is Si; Ar is phenyl; and/or X is Cl or Br, preferably Cl. In a preferred implementation, HX is HCl and the compound of the formula $M^3_pX_q$ is $AlCl_3$.

In one implementation, the reaction between a compound of the formula $A_xAr_{y'}$, HX and a compound of the formula $M^3_pX_q$ to form the perhalo(cyclo)silane and the subsequent hydro-dehalogenation reaction are performed consecutively in a single reaction vessel. Thus, the present method may further comprise adding the metal hydride to the reaction mixture containing the perhalo(cyclo)silane compound(s) (i.e., the product(s) from the reaction between the compound of the formula $A_xR'_{y'}$, HX and a compound of the formula $M^3_pX_q$), without isolating or purifying the perhalo(cyclo)silane compound(s) before the metal hydride addition.

The reaction to form the perhalo(cyclo)silane compound or composition is generally conducted under rigorously dry conditions. For example, the solvent(s) and reagents in solid or liquid phase are generally purified, degassed and dried (in accordance with conventional techniques) prior to use. Gas phase reagents (e.g., HX gas) are generally purchased in dry form, and techniques to preserve its dryness are generally employed when transferring the gas phase reagent(s) to the reaction vessel. Such gas phase reactants may be continuously added to the reaction vessel (e.g., by bubbling through the reaction mixture). The reaction to form the perhalo(cyclo)silane compound or composition may be conducted at a temperature of from about −78° C. to about 200° C., from about 0° C. to about 150° C., or from ambient temperature (e.g., from about 15° C. to about 30° C.) to about 100° C., until the reaction is complete. As for the hydrodehalogenation reaction above, the reaction to form the perhalo(cyclo)silane may be monitored (e.g., by infrared or FT-IR spectroscopy, gas phase chromatography, $^1H$ or $^{13}C$ or $^{29}Si$ NMR spectroscopy, etc.) to determine completeness. In various embodiments, the reaction may be conducted for a length of time of from 1 to 48 hours, 2 to 24 hours, or 4 to 16 hours. On a scale involving about one-half of a mole of silicon atoms, the reaction was conducted for a length of time of from 5 to 8 hours.

Generally, the solvents suitable for dissolving the perhalo(cyclo)silane described above are suitable for the reaction to form the perhalo(cyclo)silane compound(s). Typically, a catalytic amount of Lewis acid is used in this reaction. For example, the Lewis acid may be present in a ratio of from 1 to 200 mmol (or from 3 to 100 mmol, or from 5 to 50 mmol) per mole of A atoms in the compound of the formula $A_xR'_{y'}$. Alternatively, the Lewis acid may be present in a ratio of from 0.25 to 100 mmol (or from 1 to 50 mmol, or from 2 to 30 mmol) per mole of R' substituents or moieties in the compound of the formula $A_xR'_{y'}$.

A preferred method of synthesizing the compound of the formula $A_xR'_{y'}$, (e.g., $A_xAr_{y'}$) comprises reacting a compound of the formula $A_uR'_vX'_w$ with a reducing agent to form the compound of the formula $A_xR'_{y'}$. Typically, u is at least 1, v is at least 1, and w is any integer up (2u+2−v). In one implementation, A is Si, u is 1, v is 1 or 2, and w is (4−v). The reducing agent may be any reducing agent that effectively produces $A_xAr_{y'}$ from $A_uAr_vX'_w$, but preferably, the reducing agent comprises an alkali metal.

The reaction to form the compound of the formula $A_xR'_{y'}$ may also be conducted at a temperature of from about −78° C. to about 200° C., from about −20° C. to about 150° C., or from about −5° C. to about 100° C., until the reaction is complete. In one embodiment, the starting material of the formula $A_uR'_vX'_w$ is added to the reaction mixture containing the reducing agent at a first, relatively low temperature (e.g., from about −10° C. to about 10° C.), then after the starting material addition is complete, the reaction temperature is raised to ambient temperature (e.g., from about 15° C. to about 30° C.) for a first period of time, and then (optionally) the reaction mixture is heated to a temperature of less than about 80° C. (e.g., the reflux temperature of a solvent having a boiling point of less than 80° C.) for a second period of time sufficient to substantially complete the reaction. As for the hydro-dehalogenation reaction above, the reaction to form the compound of the formula $A_xR'_{y'}$ may be monitored (e.g., by infrared or FT-IR spectroscopy, gas phase chromatography, $^1H$ or $^{13}C$ or $^{29}Si$ NMR spectroscopy, or if the reducing agent is insoluble, by visually observing its disappearance, etc.) to determine completeness. In various embodiments, the first period of time may be from 15 minutes to 16 hours, 30 minutes to 12 hours, or 1 to 8 hours, the second period of time may be from 30 minutes to 48 hours, 1 to 24 hours, or 2 to 12 hours, and the total reaction time may be from 1 to 48 hours, 2 to 24 hours, or 4 to 16 hours. On a scale involving about one mole of silicon atoms, the reaction was conducted for a length of time of about 6-7 hours, and on about a 4 mole scale, for about 10 hours.

Any of the solvents described above for dissolving the perhalo(cyclo)silane or metal hydride are suitable for the coupling reaction (to form $A_xR'_{y'}$ from $A_uR'_vX'_w$), except for those that may deprotonate in the presence of the reducing agent. Preferred solvents include alkanes (e.g., $C_5$-$C_{12}$ branched or unbranched alkanes and cycloalkanes), arenes (e.g., benzene), substituted arenes (e.g., benzenes having from 1 to 3 $C_1$-$C_4$ alkyl and/or alkoxy substituents; preferably benzenes having 1 or 2 $C_1$-$C_2$ alkyl and/or methoxy substituents), aliphatic ethers (e.g., ethers having two $C_2$-$C_6$ branched or unbranched alkyl groups, or 1 methyl group and one $C_4$-$C_6$ branched or unbranched alkyl group), cyclic ethers (e.g., tetrahydrofuran or dioxane), and glycol ethers (e.g., of the formula $(CH_3(CH_2)_w)O((CH_2)_xO)_y(CH_2)_zCH_3)$, where x is independently 2-4 [preferably 2], y is 1-4 [preferably 1 or 2], and w and z are independently 0 to 3 [preferably 0]). A particularly preferred solvent for the coupling reaction is tetrahydrofuran (THF).

Generally, a slight molar excess of reducing agent is reacted with the starting material of the formula $A_uR'_vX'_w$, (e.g., from 1.0 to 1.1 moles, and preferably from 1.001 to 1.05 moles, of reducing agent per mole of X' atoms in the starting material). After the reaction is complete, a small amount (e.g., from 0.1 to 100 ml, 0.5 to 50 ml, or 1 to 25 ml) of deionized and/or distilled water may be slowly and carefully added to the reaction mixture to quench the reaction. The resulting mixture may be poured into a relatively large amount (e.g., a volume of from 1 to 5 times the reaction mixture volume) of deionized and/or distilled water (preferably at least deionized water), and stirred for a period of time of from 15 minutes to 8 hours, 30 minutes to 6 hours, or 1 to 4 hours. The reaction mixture phases may be separated (e.g., by filtering if the reaction mixture includes a solid phase, or by decanting and/or use of a separatory funnel if the reaction mixture includes more than one liquid phase), and the organic/silicon-containing phase may be washed with water and dried (e.g., under vacuum, and/or if the product of the formula $A_xR'_{y'}$ has a sufficiently high melting point, by heating to a temperature significantly below its melting point).

In addition to the process described above, compounds of the formulas $A_xR'_{y'}$, $A_xAr_{y'}$, $A_xX_y$ and/or $(AH_z)_n$ may be made by conventional methods, such as those described in, e.g., U.S. Pat. Nos. 4,554,180, 4,683,145, 4,820,788, 5,942, 637 and 6,503,570, and in, e.g., Kumada, J. Organomet. Chem., 100 (1975) 127-138, Ishikawa et al., Chem. Commun., (1969) 567, Hengge et al., J. Organomet. Chem., 212 (1981) 155-161, Hengge et al., Z. Anorg. Allg. Chem., 459 (1979) 123-130, and Hengge et al., Monatshefte für Chem., 106 (1975) 503-512, the relevant portions of which are incorporated herein by reference. Furthermore, the methods disclosed in any one of these references may be modified as suggested and/or disclosed in another of these references.

However, the preferred method comprises reducing and oligomerizing $AR'X_3$ and/or $AR'_2X_2$ (where R' is, e.g., phenyl), followed by treating with a mixture of a Lewis acid and a hydrogen halide, such as $AlCl_3$ and HCl gas, to form a corresponding Group IVA halide compound, then reducing with a metal hydride (such as lithium aluminum hydride) to form a mixture of mainly $c\text{-}(AH_2)_x$, where x is from 5 to 8, preferably 5 to 6.

Exemplary Compositions

In one aspect, the present invention relates to a composition for forming semiconductor and/or semiconducting thin films, particularly patterned semiconducting thin films, and more particularly patterned silicon thin films. The composition generally comprises (a) at least one cyclic Group IVA compound of the formula $(AH_x)_n$, where n is from 3 to 12, each of the n instances of x is 1 or 2, and each A is independently Si or Ge, and (b) less than 100 ppm of aluminum, with respect to the total number of A atoms in the Group IVA compound. Preferably, the cyclic Group IVA compound(s) comprise cyclosilanes. Thus, the terms "cyclic Group IVA compound(s)" and "cyclosilane(s)" may be used somewhat interchangeably herein. In certain embodiments, the cyclosilane has the formula $(AH_2)_n$, where n is from 5 to 8. In further preferred embodiments, the composition comprises less than 10 ppm (and more preferably, less than 1 ppm) of aluminum with respect to atoms of A in the Group IVA compound.

Examples of suitable cyclic Group IVA compounds can be found in U.S. Pat. Nos. 6,541,354, 6,527,847, 6,518,087, 6,514,801, 6,503,570, 5,942,637, 5,866,471 and 4,683,145, and in U.S. Patent Application Publication 2003/0045632, the relevant portions of each of which are incorporated herein by reference. These compounds include $c\text{-}(SiH_2)_3$, $c\text{-}(SiH_2)_4$, $c\text{-}(SiH_2)_5$, $c\text{-}(SiH_2)_6$, $c\text{-}(SiH_2)_7$, $c\text{-}(SiH_2)_8$, tetracyclo-$(SiH)_4$, pentacyclo-$(SiH)_6$, hexacyclo-$(SiH)_8$, $c\text{-}(SiH_2)_4(GeH_2)$, $c\text{-}(SiH_2)_5(GeH_2)$, $c\text{-}(SiH_2)_3(GeH_2)_2$, $c\text{-}(SiH_2)_4(GeH_2)_2$, $c\text{-}(SiH_2)_2(GeH_2)_3$, $c\text{-}(SiH_2)(GeH_2)_4$, $c\text{-}(GeH_2)_5$, and mixtures thereof.

Another aspect of the invention relates to the chemical makeup of the present composition. For example, at least 90 mol % (preferably at least 95 mol %) of the composition consists essentially of the cyclic Group IVA compound (which may, in turn consist of a mixture of such cyclic Group IVA compounds, as described above). In some examples, at least 98 mol % of the composition consists essentially of the cyclic Group IVA compound(s).

Exemplary Inks

In another aspect, the present invention concerns an ink for printing or otherwise forming a semiconductor and/or semiconducting thin film. The ink may comprise or consist essentially of the exemplary (cyclo)silane composition described above. Where the ink consists essentially of the (cyclo)silane, the (cyclo)silane may also function as a solvent for other components (such as binding agents, thickening agents, photosensitizers, semiconductor nanoparticles, etc.). Alternatively, the ink may include, for example, the exemplary (cyclo)silane composition described above and a solvent in which the composition is soluble. In such an embodiment, the (cyclo)silane compound(s) may be present in the ink in a percentage by volume of from 0.1 to 50 vol. %, from 0.5 to 30 vol. %, or from 1.0 to 20 vol. %.

In further embodiments, the solvent in the present ink comprises an aprotic solvent and/or an apolar solvent. In the context of the present invention, an "apolar" solvent is one that may have a gas-phase dipole moment of about 2 debyes or less, about 1 debye or less, or about 0.5 debye or less. In many implementations, an apolar solvent has a dipole moment of about 0 debyes, due to its molecular symmetry (e.g., carbon tetrachloride, tetrachloroethylene, benzene, p-xylene, dioxane) and/or highly covalent nature of the chemical bonds therein (e.g., mineral spirits, hexane, cyclohexane, toluene). In some embodiments, the present ink comprises a solvent having a boiling point of about or less than 250° C., preferably about or less than 200° C., and more preferably about or less than 150° C., at atmospheric pressure.

Exemplary solvents for the present ink composition include alkanes (e.g., $C_5\text{-}C_{12}$ branched or unbranched alkanes and cycloalkanes, preferably $C_6\text{-}C_{10}$ cycloalkanes such as cyclooctane), halogenated alkanes (e.g., $C_1\text{-}C_4$ alkanes having from 1 to 2n+2 halogen substituents and $C_3\text{-}C_6$ cycloalkanes having from 1 to 2n halogen substituents such as fluorine, chlorine and/or bromine, where n is the number of carbon atoms; preferably $C_1\text{-}C_2$ alkanes having from 2 to 2n+2 fluorine and/or chlorine substituents), arenes (e.g., benzene), substituted arenes (e.g., N-methylpyrrole or $C_6\text{-}C_{10}$ arenes having from 1 to 8 halogen substituents and/or $C_1\text{-}C_4$ alkyl and/or alkoxy substituents; preferably benzenes having from 1 to 6 fluorine, chlorine, $C_1\text{-}C_2$ alkyl and/or methoxy substituents), aliphatic ethers (e.g., ethers having two $C_2\text{-}C_6$ branched or unbranched alkyl groups, or 1 methyl group and one $C_4\text{-}C_6$ branched or unbranched alkyl group), cyclic ethers (e.g., tetrahydrofuran or dioxane), and glycol ethers (e.g., of the formula $(CH_3(CH_2)_w)O((CH_2)_xO)_y(CH_2)_zCH_3$, where x is independently 2-4 [preferably 2], y is 1-4 [preferably 1 or 2], and w and z are independently 0 to 3 [preferably 0]). Cycloalkanes (notably cyclooctane) appear to provide the best results with respect to ink stability.

The present ink may further comprise a surfactant (e.g., a surface tension reducing agent, wetting agent, etc.), a binder and/or a thickening agent, although no such additives are required. In fact, it is advantageous for the ink to exclude such additional components, particularly where such additional components include sufficiently high molar proportions of elements such as carbon, oxygen, sulphur, nitrogen, halogens or heavy metals to adversely affect electrical properties of the resulting thin film. Thus, in one embodiment, the present ink includes a small or trace amount of one or more high molecular weight silanes (e.g., as described above), in an amount effective to improve the wetting characteristics of the ink. Such higher molecular weight silanes may be formed by the preferred method of making a hydrogenated (cyclo)silane. However, where they are present, each of these additional components may be present in trace amounts in the present ink composition. However, the surface tension reducing agent, which is conventional, may be present in an amount of from 0.01 wt. % to 1 wt. %, preferably 0.02 wt. % to 0.1 wt. % of the ink composition. In certain embodiments, the surface tension reducing agent may comprise a conventional hydrocarbon surfactant, a conventional fluorocarbon surfactant or a mixture thereof. The wetting agent is generally present in an amount of from 0.05 wt. % to 1 wt. %, preferably 0.1 wt. % to 0.5 wt. % of the ink composition. The surfactant may be present in an amount of from 0.01 wt. % to 1 wt. %, preferably 0.05 wt. % to 0.5 wt. % of the ink composition. The binder and/or thickening agent, each of which is conventional, may be present in an amount sufficient to provide the ink composition with predetermined flow properties at a given processing temperature. However, typical amounts of these components in the composition are from 0.01 wt. % to 10 wt. %, preferably 0.1 wt. % to 5 wt. %

Exemplary Methods of Forming a Semiconductor and/or Semiconducting Thin Film

The present invention further concerns a method of forming a semiconductor and/or semiconducting thin film from the present (cyclo)silane compound(s), composition and/or ink. This method may comprise the steps of depositing a layer of the (cyclo)silane composition compound(s), composition and/or ink on a substrate; and curing the compound(s), composition and/or ink to form the semiconductor film. As discussed above, in general, the composition comprises or consists essentially of the (cyclo)silane compound(s), and the ink comprises the composition and a solvent in which the cyclic Group IVA compound is soluble.

In this method, depositing may comprise spin coating, dip coating, spray coating, ink jetting, slit coating, meniscus coating, or microspotting the (cyclo)silane compound(s), composition or ink on the substrate. Also, curing may comprise oligomerizing and/or polymerizing the cyclic Group IVA (cyclosilane) compound. Oligomerizing and/or polymerizing the cyclosilane generally comprises (i) heating the composition to a temperature of at least about 100° C. (preferably at least about 200° C. or at least about 300° C. to transform the cyclosilane into a higher molecular weight oligomeric, polymeric or [hydrogenated] elemental material), (ii) irradiating the compound or composition, or (iii) both heating and irradiating, as described in (i) and (ii). When curing is performed at a relatively low temperature (e.g., from about 100° C. to about 200° C., preferably from about 100° C. to about 150° C.), it generally evaporates or removes the solvent (particularly when performed under vacuum), and may transform part or all of the cyclosilane into a higher molecular weight oligomeric or polymeric material. Thus, curing may comprise (i) a first heating phase at a first temperature to evaporate and/or remove any solvent, and (ii) a second heating phase at a second temperature higher than said first temperature to transform the cyclosilane into a polymeric or (hydrogenated) elemental material. Typically, curing times may vary from 10 seconds to 60 minutes (preferably 30 seconds to 30 minutes) depending on the applied temperature and the desired film characteristics (e.g., hydrogen content, impurity level, density or extent of densification, level or percentage of crystallinity, doping levels, doping profile, etc.). Furthermore, when an ink is deposited, curing may further comprise drying the ink before heating and/or irradiating the compound or composition.

When the method of making a film includes irradiating the (cyclo)silane compound(s) or composition, the method may further comprise patterning the semiconductor thin film. In one embodiment, patterning comprises selectively irradiating portions of the layer of (cyclo)silane compound(s), composition or ink with light having a wavelength and/or intensity sufficient to oligomerize, polymerize or otherwise reduce the solubility of the (cyclo)silane compound(s) in the irradiated portions, and subsequently removing non-irradiated portions of the layer with a suitable solvent to form the pattern (e.g., developing the layer). The substep of selectively irradiating the layer may comprise (i) positioning at least one of the substrate and a mask such that the portions of the composition that will form the patterned structures can be selectively irradiated, and the non-irradiated portions (i.e., corresponding to the areas of the layer to be removed) cannot be irradiated, then (ii) irradiating the layer with light (e.g., ultraviolet, visible or infrared light) through the mask. The mask, which is conventional, is generally one that absorbs light of a wavelength or wavelength range used for the irradiating substep. Preferred UV radiation sources include those with an emission at 254 nm (e.g., a conventional handheld UV-lamp, an Hg lamp, etc.), as are known in the art.

The curing step may comprise a "polysilane" formation phase or step, and an annealing phase or step. The term "polysilane" is used as a convenient notation for any polymer of silane, germane, or combination thereof. Conversion of the cyclic Group IVA compound(s) to form a doped or undoped polysilane, polygermane, poly(germa)silane or poly(sila)germane generally occurs by irradiation with an appropriate dose of an appropriate energy of radiation, or thermally at a temperature around or above 100° C. A conventional radical initiator, such as 2,2'-azobisisobutyronitrile (AIBN), 1,1'-azobiscyclohexanecarbonnitrile, dibenzoylperoxide, butyl lithium, silyl potassium or hexamethyldisilane (and others) may lower the temperature for polysilane formation to below 100° C. Other methods to catalyze the formation of polysilanes from the cyclic Group IVA compound(s) include adding known transition metal complexes such as cyclopentadienyl complexes of early transition metals such as Hf, Zr, Ti and V (and known derivatives thereof). The amount of radical initiator added can vary from 0.00001 mol % to 10 mol % with respect to the cyclic Group IVA compound(s). Polysilanes may also be formed by ring opening polymerization of cyclic silanes. Formation of the semiconductor film generally occurs at a temperature above 200° C., more preferably above 300° C., and most preferably from about 350° C. to about 400° C.

Preferred curing conditions for films formed from the present cyclic Group IVA compound(s), composition or ink include curing at a temperature of about 400° C. or less, in the presence of a reducing atmosphere such as an argon/hydrogen mixture. Such conditions are believed to remove hydrogen and carbon-containing species from the film effectively and/or at a suitable rate. However, in such a case, subsequent lower-temperature annealing of a silicon film formed from such cured compositions may dramatically improve the film's electrical characteristics. The lower-temperature annealing is generally conducted in a reducing atmosphere (preferably in an argon-hydrogen mixture, more preferably containing $\leq 10\%$ $H_2$ by weight or moles, and in one implementation, about 5 wt. % $H_2$), at a temperature in the range of from 250° C. to 400° C., preferably from about 300° C. to about 350° C., for a length of time of from 10 minutes to 12 hours, preferably from about 30 minutes to about 10 hours, and in one implementation, about 8 hours.

After curing and/or annealing, the method may further comprise cleaning the substrate with the patterned semiconductor thin film thereon, for example to remove any uncured composition or ink. This step may comprise rinsing with or immersing the substrate in a solvent, draining the solvent from the substrate, and drying the substrate and patterned semiconductor thin film. Solvent rinsing or washing may include the same procedure(s) as are typically used in photoresist development and/or photoresist etching (e.g., rinsing, immersing, spraying, vapor condensation, etc.). Preferred solvents include solvents in which the unpolymerized cyclic Group IVA compounds have a high solubility, such as the hydrocarbon and ether solvents described above for the exemplary ink.

In preferred embodiments, the pattern comprises a two-dimensional array of lines having a width of from 100 nm to 100 µm, preferably from 0.5 µm to 50 µm, and more preferably from 1 µm to 20 µm. The lines may have an inter-line spacing of from 100 nm to 100 µm, preferably 200 nm to 50 µm, more preferably 500 nm to 10 µm. Furthermore, at least a subset of the lines may have a length of from 1 µm to 5000 µm, preferably 2 µm to 2000 µm, more preferably 5 µm to 1000 µm, and a thickness of from 0.001 µm to 1000 µm, preferably 0.01 µm to 500 µm, more preferably 0.05 µm to 250 µm. Furthermore, the lines may comprise a first set of parallel lines along a first axis, and a second set of parallel lines along a second axis perpendicular to the first axis. Although parallel and perpendicular lines may minimize adverse effects from adjacent lines and/or maximize the predictability of electromagnetic field effects from adjacent lines, the patterned lines may take any shape and/or take any course that can be designed and formed.

Exemplary Semiconducting Thin Film Structures

A further aspect of the invention relates to a semiconducting thin film structure comprising or consisting essentially of a partially hydrogenated, at least partially amorphous Group IVA element, the Group IVA element comprising at least one of silicon and germanium, the semiconducting material having less than 100 ppm (preferably less than 10 ppm, more preferably less than 1 ppm) of Group IIIA metal contaminants (other than intentionally added boron) relative to the Group IVA element. In many cases, the semiconducting thin film structure comprises a pattern of semiconducting material on a substrate. The semiconducting material in the present semiconducting thin film structure is preferably made from the present composition and/or according to the present method(s). The cyclic Group IVA compound(s) in the present composition may help improve the quality of the thin film interface to adjacent oxide, for example by improving planarization of the semiconductor thin film. Improved adherence to an underlying substrate may also be provided, possibly by increasing the surface area of the film that makes chemical and/or physical contact with the underlying substrate at or before the time of curing and/or annealing.

In the present thin film structure, the at least partially hydrogenated amorphous Group IVA element preferably comprises amorphous silicon. Also, the (partially) hydrogenated, amorphous Group IVA element may farther comprise a dopant (e.g., B, P or As), which may be covalently bound to Group IVA atoms therein (see, e.g., copending and commonly assigned U.S. Ser. No. 10/616,147, filed on Jul. 8, 2003, the relevant portions of which are incorporated herein by reference). In such a case, the dopant concentration profile or gradient may be substantially uniform throughout the entire thickness of the semiconductor thin film.

In another embodiment, the cured thin film may have a controlled doping profile; for example, it may comprise multiple layers of differently doped silicon. In one embodiment, a bottom layer may comprise one of p-doped silicon (i.e., where the composition comprises a compound containing boron) or n-doped silicon (i.e., where the composition comprises a compound containing P or As), a second layer thereon may comprise the other of p-doped silicon or n-doped silicon, an optional third layer on the second layer that comprises silicon having the same dopant type (p-doped or n-doped) as the bottom layer, in which the dopant may be present in the same, a higher or a lower concentration than the bottom layer, an optional fourth layer on the third layer that comprises silicon having the same dopant type (p-doped or n-doped) as the second layer, in which the dopant may be present in the same, a higher or a lower concentration than the second layer, and so on. Alternatively, the cured thin film may comprise lightly doped silicon (i.e., where the composition comprises a compound containing B, P or As in an amount or percentage by weight or moles sufficient to provide, e.g., from $10^{-11}$ to $10^{-7}$ moles of dopant per mole of Group IVA element) and a layer or region of heavily doped silicon (e.g., where the composition comprises a compound containing B, P or As in an amount or percentage by weight or moles sufficient to provide, e.g., from $10^{-7}$ to $10^4$ moles of dopant per mole of Group IVA element) of the same dopant type. Such a structure may further comprise (i) a layer or region of oppositely doped silicon above it, below it and/or adjacent to it, and/or (ii) a layer or region of very heavily doped silicon (e.g., where the composition comprises a compound containing B, P or As in an amount or percentage by weight or moles sufficient to provide, e.g., from $10^{-4}$ to $10^{-3}$ moles of dopant per mole of silicon) above it and/or adjacent to it.

In a further embodiment, the semiconducting thin film may comprise one or more layers in a thin film transistor (TFT) and/or capacitor (such as a MOS capacitor). In yet another embodiment, the semiconducting thin film may be used for a photovoltaic device. For instance, a photovoltaic device may be made by the above process, but with a film thickness of from 1 to 1000 microns, preferably 5 to 500 microns, whereas the preferred thickness for a TFT is from 10 to 500 nm, more preferably from 50 to 100 nm.

However, in a preferred embodiment, the present thin film structure comprises a patterned, two-dimensional array of lines, each line having a width of from 100 nm to 100 μm, more preferably from 0.5 μm to 50 μm, and even more preferably from 1 μm to 20 μm. The lines may have an inter-line spacing of from 100 nm to 100 μm, preferably from 0.5 μm to 50 μm, more preferably from 1 μm to 20 μm. The thin film pattern lines may also have a length of from 1 μm to 5000 μm, at least a subset of the lines preferably having a length of from 2 μm to 1000 μm, more preferably from 5 μm to 500 μm. The lines may have a thickness of from 0.001 μm to 1000 μm, preferably from 0.005 μm to 500 μm, more preferably from 0.05 μm to 100 μm.

In certain embodiments, the substrate may comprise a transparent glass or plastic display window, and the circuit, circuit element, integrated circuit or block thereof may comprise a thin film transistor (TFT) display element. Alternatively, the substrate may comprise a silicon wafer or metal substrate, and the circuit, circuit element, integrated circuit or block thereof may comprise a radio frequency identification circuit (e.g., a so-called RF ID tag or device).

EXAMPLES

Synthesis of Perphenylcyclosilanes

In a 3 L four neck round bottom flask fitted with an addition funnel, a reflux condenser, a thermocouple and an overhead stirrer, 18.3 g (2.64 mol) Li ribbon (Aldrich, 0.38 mm thick) cut into small pieces under argon are suspended in 1 L of dry THF (tetrahydrofuran). Under vigorous stirring, 333 g (1.32 mol) $Ph_2SiCl_2$ (Aldrich) is added to this suspension at a rate that allows for complete addition after 60 to 80 minutes. The suspension is kept between −5° C. and 5° C. during addition. After addition is complete, the reaction solution is allowed to warm up to room temperature. Additional stirring for a minimum of 3 hrs, or until all lithium has reacted, produces a yellow to red colored suspension. The suspension is heated to reflux for 3 hrs. After cooling to room temperature, any remaining silyllithium compounds are destroyed by adding a small amount (2-10 mL) of deionized water. The resulting white suspension (which can be handled in ambient atmosphere) is poured onto 4 L of deionized water and stirred vigorously for 3 hours. The off white precipitate is filtered and washed with 5×200 mL of DI water followed by 5×200 mL of cyclohexane. The resulting colorless powder is dried under vacuum at 180° C. for 24 hours. The yield after drying is 200 g.

A thermogravimetric analysis of the powder indicated no mass loss when heated to 200° C. $^1$H-NMR analysis showed that the powder is a mixture containing at least 4 different species. The relative amounts observed for each species may vary from batch to batch. Generally, the reaction products include 60-98 mol % $(Ph_2Si)_5$, 1-40 mol % $(Ph_2Si)_4$ and 0.5-10 mol % for other species, including $(Ph_2Si)_6$. The components of the mixture may be separated by recrystallization from toluene or ethyl acetate, whereby both $(Ph_2Si)_5$ and $(Ph_2Si)_4$ have been isolated in >99% purity as determined by $^1$H-NMR. The identity of both $(Ph_2Si)_5$ and $(Ph_2Si)_4$ have been verified by X-ray structure determination and melting point determination.

Larger Scale Synthesis of Perphenylcyclosilanes

In a 12 L four neck round bottom flask fitted with an addition ftunnel, a reflux condenser, a thermocouple and an overhead stirrer, 73.6 g (10.6 mol) Li ribbon (Aldrich, 0.38 mm thick) cut into small pieces under argon, is suspended in 4 L of dry THF (tetrahydrofuran). Under vigorous stirring, 1.338 kg (5.284 mol) $Ph_2SiCl_2$ (Aldrich) is added to the suspension at a rate that allows for complete addition after 210 minutes. The suspension is kept between −5° C. and 5° C. during addition. After addition is complete, the reaction solution is allowed to warm up to room temperature. Additional stirring for a minimum of 3 hrs, or until all lithium has reacted, produces a yellow to red colored suspension. The suspension is heated to reflux for 7 hrs. After cooling to room temperature, any remaining silyllithium compounds are destroyed by adding a small amount (10-20 mL) of deionized water. The resulting white suspension (which can be handled in ambient atmosphere) is poured into 20 L of deionized water and stirred vigorously for 3 hours. The off white precipitate is filtered and washed with 3×1000 mL of DI water followed by 3×500 mL of cyclohexane. The resulting colorless powder is dried under vacuum at 170° C. for 24 hours. The yield after drying is 760 g.

A thermogravimetric analysis of the powder indicated no mass loss when heated to 200° C. $^1$H-NMR analysis showed that the powder is a mixture containing at least 4 different species (see Table 1). In one example, the mixture contained 72 mol % $(Ph_2Si)_5$, 25 mol % $(Ph_2Si)_4$, and 3 mol % of other species, including $(Ph_2Si)_6$. Data from other examples are shown in Table 1. The mixture may be separated by recrystallization from toluene or ethyl acetate, whereby $(Ph_2Si)_5$ has been isolated in >95% purity as determined by $^1$H-NMR. The identities of both $(Ph_2Si)_5$ and $(Ph_2Si)_4$ have been verified by melting point determination.

TABLE 1

| Example | Amount (g) | $[Ph_2Si]_5$ (%) | $[Ph_2Si]_4$ (%) | Other Phenylsilane species including $[Ph_2Si]_6$ (%) | Yield (%, based on $[Ph_2Si]_x$, x = 4, 5) |
|---|---|---|---|---|---|
| 1 | 142 | 70 | 27 | 4 | 76 |
| 2 | 188 | 64 | 32 | 4 | 78 |
| 3 | 118 | 90 | 5 | 5 | 71 |
| 4 | 203 | 90 | 5 | 5 | 85 |
| 5 | 200 | 71 | 24 | 5 | 83 |
| 6 | 197 | 70 | 26 | 5 | 82 |
| 7 | 207 | 86 | 8 | 6 | 86 |
| 8 | 99 | 85 | 9 | 6 | 82 |
| 9 | 204 | 85 | 9 | 6 | 85 |
| 10 | 203 | 92 | 3 | 5 | 85 |
| 11 | 203 | 84 | 7 | 9 | 84 |
| 12 | 760 | 73 | 22 | 5 | 79 |

Synthesis of Cyclosilanes

In a 3 L 3-neck flask equipped with a reflux condenser and a gas dispersion tube, 100 g of a perphenylcyclosilane mixture obtained as described above and 3 g freshly sublimed $AlCl_3$ are suspended in 1 L of dry cyclohexane. Under vigorous stirring, dry HCl gas is bubbled through this suspension at ambient temperature until an almost colorless to yellow solution is obtained. Under continuous HCl addition, the solution is stirred for another 5-8 hrs or until all phenyl groups have been replaced by chlorine as indicated by $^1$H-NMR, $^{29}$Si—NMR and FT-IR. 400 mL of a 1M ethereal solution of $LiAlH_4$ (Aldrich) is added under vigorous stirring to the perchlorocyclosilane solution at 0° C. After 1 hour, the addition is complete, and the resulting suspension is further stirred at room temperature for another 15 hrs. Two phases are formed upon removing 800 ml solvent under reduced pressure. The lower phase containing precipitated byproduct is removed with a separatory funnel to yield about 125 ml of a clear solution. The reaction product is distilled under reduced pressure (0.5 Torr, 25° C.) to afford 9 ml clear colorless liquid.

$^1$H-NMR, $^{29}$Si—NMR, GC/MS, GPC/UV and GPC/RI analysis of the liquid confirm that a mixture of (cyclo)silanes has been formed with cyclopentasilane as the main component (between 75 and 99 mol %). Cyclohexasilane can be identified as a second component (between 0.5 and 10 mol %). Other silane species are formed in amounts between 0 and 6 mol %, as well as aromatic and aliphatic byproducts. Table 2 below lists product distribution data in wt. % (as determined by GC/MS) from a number of examples of cyclosilane synthesis performed according to this description. The numbers may not add up to 100% in all cases due to rounding.

TABLE 2

| Example | Amount (g) | $[H_2Si]_5$ (%) | $[H_2Si]_6$ (%) | $[H_2Si]_x$ x > 6 (%) | $Si_nH_{2n+2}$ $4 \leq n \leq 8$ (%) | $Si_nH_{2n-x}$ n > 4, x > 0 (%) | Organics (%) |
|---|---|---|---|---|---|---|---|
| 13 | 3.0 | 78.8 | 8.6 | 0.3 | 5.0 | 0.2 | 7.2 |
| 14 | 6.0 | 88.3 | 4.7 | 0.0 | 1.4 | 0.2 | 5.3 |
| 15 | 4.0 | 91.1 | 5.8 | 0.0 | 1.3 | 0.0 | 5.3 |
| 16 | 1.9 | 90.4 | 7.0 | 0.3 | 0.8 | 0.7 | 0.9 |
| 17 | 7.9 | 91.4 | 7.2 | 0.2 | 0.5 | 0.0 | 0.7 |
| 18 | 3.8 | 83.8 | 10.0 | 0.5 | 1.3 | 0.2 | 4.2 |
| 19 | 2.3 | 99.4 | 0.6 | 0.0 | 0.0 | 0.0 | 0.0 |
| 20 | 7.2 | 92.1 | 5.2 | 0.2 | 0.7 | 0.9 | 0.9 |
| 21 | 7.3 | 85.5 | 9.7 | 1.0 | 1.1 | 0.5 | 2.2 |
| 22 | 9.5 | 92.3 | 6.4 | 0.1 | 0.7 | 0.2 | 0.3 |

Water Wash.

1 mL of a cyclosilane mixture as described above was added to an amber vial containing 2 ml degassed, deionized (DI) water. The two phases were mixed vigorously and allowed to sit for 1 min. The upper phase (which contained the cyclosilane) was then transferred to another vial, dried over 4 Å molecular sieves and filtered through a 0.2 μm membrane to obtain a clear liquid.

Treating the cyclosilane mixture with water after distillation of the raw material effects a substantial reduction of the amount of Al in the silane and substantially removes Al contamination in the Si film after spin coating. The amount of Al in the silane mixture before treating with water may be as high as 2%, depending on the nature and amount of Al byproduct (following the reduction of the perchlorocyclosilane mixture and the distillation procedure used to purify the reduced cyclosilane mixture). Regardless of the absolute amount of Al before contact with water, water washing and the subsequent separation of the silane phase from the water phase that now contains the Al component results in a silane film after spin coating in which the Al content is reduced to less than 100 ppm, preferably less than 10 ppm and more preferably less than 1 ppm. The treatment with water may also be carried out with slightly acidified water (e.g., water containing buffered acetic acid to keep the pH below 7). Exposure of the silane mixture to alkaline conditions should be avoided as it may lead to uncontrolled Si—Si bond scission and polymerization. Minimal chemical effects on the silane composition may be achieved when aqueous washing is carried out (preferably with neutral or DI water). It has been found that continued or longer exposure of the cyclosilane mixture to water may lead to isomerization of some silanes to different silanes, including higher molecular weight silanes. This effect may be advantageously used to adjust the volatility and/or viscosity of the silane composition in an ink before deposition. For example, viscosity, surface tension and wetting behavior of the resulting silane composition/film may be adjusted in this way. Contact with water can occur by either adding the silane mixture to water or adding the water to the silane mixture. The ratio of water to silane mixture is in the range of 10:1 to 1:10, more preferably between 5:1 and 1:5, and even more preferably it is about 2:1. The silane mixture after separation from the aqueous phase is further dried using standard drying methods, such as contacting with molecular sieves. Preferably, the molecular sieves comprise beads of the 4 Å type (e.g., commercially available from Aldrich Chemical Co.). After filtering, as the cyclosilane is generally temperature and light sensitive, so it is stored at low temperatures, preferably at or below room temperature and with light and UV protection (e.g., storing in a darkened vial or wrapping with aluminum foil) to further avoid any unwanted isomerization or generation of higher molecular weight components.

CONCLUSION/SUMMARY

Thus, the present invention provides a method for making a (cyclo)silane, a silane composition having reduced metal impurities, an ink including the silane composition, and a method for making semiconductor structures and/or semiconducting thin films. By washing the (cyclo)silane with a polar-phase washing composition or agent, a substantial amount of certain metal impurities (e.g., aluminum and/or alkali metals, such as lithium or sodium) may be removed, thereby greatly improving the electrical properties of a thin film formed from a composition containing the (cyclo)silane.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of making a hydrogenated Group IVA compound, comprising the steps of:
    a) reacting one or more reducible Group IVA compounds with a metal hydride to form a metal-contaminated, hydrogenated Group IVA compound, said metal-contaminated, hydrogenated Group IVA compound consisting essentially of (i) Si and/or Ge, and (ii) hydrogen; and
    b) washing said metal-contaminated, hydrogenated Group IVA compound with a washing composition comprising deionized water to decontaminate said metal-contaminated, hydrogenated Group IVA compound.

2. The method of claim 1, wherein said reducible Group IVA compounds comprise one or more compound(s) of the formula $A_xX_y$, where each A is independently Si or Ge, each X is independently a halogen, x is from 3 to 12, and y is from x to (2x+2).

3. The method of claim 1, wherein said metal-contaminated, hydrogenated Group IVA compound is washed with the washing composition sufficiently to remove a substantial amount of metal contaminants.

4. The method of claim 1, wherein said metal hydride comprises a compound of the formula $M^1_a M^2_b H_c R_d$, where $M^1$ and $M^2$ are independently first and second metals, each R in said metal hydride is independently a ligand bound to at least one of $M^1$ and $M^2$ by a covalent, ionic or coordination bond, at least one of a and b is at least 1, c is at least 1, and d is 0 or any integer up to one less than the number of ligand binding sites available on the (a+b) instances of $M^1$ and $M^2$.

5. The method of claim 4, wherein said washing step is conducted sufficiently to remove a substantial amount of said first and/or second metals.

6. The method of claim 1, wherein said washing composition consists essentially of deionized water.

7. The method of claim 1, wherein said washing composition comprises dilute aqueous acid.

8. The method of claim 7, wherein said washing composition has a pH of from 1 to less than 7.

9. The method of claim 7, wherein said washing composition is selected from the group consisting of dilute aqueous HCl, dilute aqueous HBr, and dilute aqueous HI.

10. The method of claim 1, wherein said washing composition comprises a buffered aqueous acid.

11. The method of claim 10, wherein said buffered aqueous acid comprises dilute aqueous acetic acid buffered with ammonium acetate.

12. The method of claim 1, wherein said washing composition and said metal-contaminated Group IVA compound are present in a volume ratio of from 10:1 to 1:10.

13. The method of claim 12, wherein said volume ratio is from 5:1 to 1:5.

14. The method of claim 1, wherein said hydrogenated Group IVA compound comprises of a cyclic Group IVA compound of the formula $(AH_z)_n$, where n is from 3 to 12, and each of the n instances of z is independently 1 or 2.

15. The method of claim 14, wherein A is Si, n is from 5 to 8, and z is 2.

16. The method of claim 2, wherein X is Cl.

17. The method of claim 4, wherein d is 0.

18. The method of claim 17, wherein $M^1$ comprises an alkali or alkaline earth metal, $M^2$ comprises a member selected from the group consisting of transition metals and Group IIIA elements, and a and b are each an integer of at least one.

19. The method of claim 18, wherein $M^2$ comprises aluminum.

20. The method of claim 4, wherein $M^2$ comprises a member selected from the group consisting of transition metals and Group IIIA elements, a is 0 or 1, d is at least 1, and each R is independently a member selected from the group consisting of an alkyl group, an alkoxy group, an alkoxyalkylene group, an alkoxyalkyleneoxy group, and a cyano group.

21. The method of claim 20, wherein a is 0.

22. The method of claim 21, wherein $M^2$ comprises aluminum, R is a $C_1$-$C_6$ alkyl group, and c and d are integers having a ratio of from 1:2 to 2:1.

23. The method of claim 4, wherein $M^2$ comprises aluminum.

24. The method of claim 23, wherein a is 1; $M^1$ comprises an alkali metal; each R is independently a $C_1$-$C_6$ alkyl group, a $C_1$-$C_6$ alkoxy group, a $C_1$-$C_4$ alkyl-$C_1$-$C_6$ alkylene group, a $C_1$-$C_4$ alkoxy-$C_1$-$C_6$ alkylene group or a $C_1$-$C_4$ alkoxy-$C_1$-$C_6$ alkyleneoxy group; and c and d are integers having a ratio of from 1:3 to 3:1.

25. The method of claim 4, wherein after said washing step, said first and second metals are present in a concentration or amount of less than 100 parts per million Group IVA atoms in said hydrogenated Group IVA compound.

26. The method of claim 25, wherein after said washing step, said first and second metals are present in an amount of less than 10 parts per million Group IVA atoms in said hydrogenated Group IVA compound.

27. The method of claim 26, wherein after said washing step, said first and second metals are present in an amount of less than 1 part per million Group IVA atoms in said hydrogenated Group IVA compound.

28. The method of claim 2, further comprising the step of reacting a compound of the formula $A_{x'}R_{y'}$ with HX and a Lewis acid to form said compound of the formula $A_{x'}X_{y'}$, wherein x' is from 3 to 12, y' is from x' to (2x'+2), and R is an alkyl group or an aryl group which may be substituted with alkyl, alkoxy, aryl, aralkyl, halogen and/or nitro groups.

29. The method of claim 28, wherein R comprises a phenyl group.

30. The method of claim 28, wherein said Lewis acid comprises a compound of the formula $M^3{}_p X_q$, where $M^3$ comprises a member selected from the group consisting of transition metals and Group IIIA elements, p is 1 or 2, and q is any integer up to the number of ligand binding sites available on the p instances of $M^3$.

31. The method of claim 30, wherein $M^3$ comprises Al, and X comprises Cl or Br.

32. The method of claim 28, further comprising the step of reacting a compound of the formula $A_u R_v X_w$ with a reducing agent to form said compound of the formula $A_x R_{y'}$, wherein x' is from 3 to 12, y' is from x' to (2x'+2) u is at least 1, v is at least, and w is any integer up to (2u+2−v).

33. The method of claim 32, wherein A is Si, u is 1, v is 1 or 2, and w is (4−v).

34. The method of claim 32, wherein R comprises a phenyl group.

35. The method of claim 32, wherein said reducing agent comprises an alkali metal.

36. The method of claim 1, further comprising the step of drying said hydrogenated Group IVA compound.

37. The method of claim 1, further comprising the step of distilling said hydrogenated Group IVA compound.

38. A method of making a hydrogenated Group IVA compound, comprising the steps of:
  a) reacting one or more reducible Group IVA compound(s) with a metal hydride to form a metal-contaminated, hydrogenated Group IVA compound, said metal-contaminated, hydrogenated Group IVA compound consisting essentially of (i) Si and/or Ge, and (ii) hydrogen;
  b) washing said metal-contaminated, hydrogenated Group IVA compound with a washing composition comprising an immiscible polar solvent to decontaminate said metal-contaminated, hydrogenated Group IVA compound; and
  c) separating said washing composition containing metal contaminants from said hydrogenated Group IVA compound.

39. The method of claim 38, wherein said one or more reducible Group IVA compound(s) comprise one or more compound(s) of the formula $A_x X_y$, where each A is independently Si or Ge, each X is independently a halogen, x is from 3 to 12, and y is from x to (2x+2).

40. The method of claim 38, wherein said metal-contaminated, hydrogenated Group IVA compound is washed with said washing composition sufficiently to remove a substantial amount of metal contaminants.

41. The method of claim 38, wherein said metal hydride comprises a compound of the formula $M^1{}_a M^2{}_b H_x R_d$, where $M^1$ and $M^2$ are independently first and second metals, each R in said metal hydride is independently a ligand bound to at least one of $M^1$ and $M^2$ by a covalent, ionic or coordination bond, at least one of a and b is at least 1, c is at least 1, and d is 0 or any integer up to one less than the number of ligand binding sites available on the (a+b) instances of $M^1$ and $M^2$.

42. The method of claim 41, wherein said washing step is conducted sufficiently to remove a substantial amount of said first and/or second metals.

43. The method of claim 38, wherein said washing composition consists essentially of said polar, immiscible solvent.

44. The method of claim 38, wherein said washing composition consists essentially of deionized water.

45. The method of claim 38, wherein said washing composition comprises dilute aqueous acid.

46. The method of claim 45, wherein said washing composition has a pH of from 1 to less than 7.

47. The method of claim 45, wherein said washing composition is selected from the group consisting of dilute aqueous HCl, dilute aqueous HBr, dilute aqueous HI, and dilute aqueous acetic acid.

48. The method of claim 38, wherein said washing composition comprises a buffered aqueous acid.

49. The method of claim 47, wherein said washing composition further comprises a mixture of a dilute aqueous acid and an acid salt, said acid salt comprising a compound of the formula $M^4{}_a X_b$, wherein each instance of $M^4$ is independently a member selected from the group consisting of alkali metals, alkaline earth metals, and ammonium ion, X is selected from the group consisting of halogens, phosphate, oxalate, tartrate, and acetate, a is 1 or 2, and b is any integer up to the number of ligand binding sites available on the a instances of $M^4$.

50. The method of claim 38, wherein said washing composition and said metal-contaminated, hydrogenated Group IVA compound are present in a volume ratio of from 10:1 to 1:10.

51. The method of claim 38, wherein said hydrogenated Group IVA compound comprises a cyclic Group IVA compound of the formula $(AH_z)_n$, where n is from 3 to 12, and each of the n instances of z is independently 1 or 2.

52. The method of claim 51, wherein A is Si, n is from 5 to 8, and z is 2.

53. The method of claim 39, wherein X is Cl.

54. The method of claim 41, wherein d is 0.

55. The method of claim 54, wherein $M^1$ comprises an alkali or alkaline earth metal, $M^2$ comprises a member selected from the group consisting of transition metals and Group IIIA elements, and a and b are each an integer of at least one.

56. The method of claim 55, wherein $M^2$ comprises aluminum.

57. The method of claim 41, wherein $M^2$ comprises a member selected from the group consisting of transition metals and Group IIIA elements, a is 0 or 1, d is at least 1, and each R is independently a member selected from the group consisting of an alkyl group, an alkoxy group, an alkoxyalkylene group, an alkoxyalkyleneoxy group, and a cyano group.

58. The method of claim 41, wherein a is 0.

59. The method of claim 41, wherein $M^2$ comprises aluminum, R is a $C_1$-$C_6$ alkyl group, and c and d are integers having a ratio of from 1:2 to 2:1.

60. The method of claim 41, wherein $M^2$ comprises aluminum.

61. The method of claim 60, wherein a is 1; $M^1$ comprises an alkali metal; each R is independently a $C_1$-$C_6$ alkyl group, a $C_1$-$C_6$ alkoxy group, a $C_1$-$C_4$ alkyl-$C_1$-$C_6$ alkylene group, a $C_1$-$C_4$ alkoxy-$C_1$-$C_6$ alkylene group or a $C_1$-$C_4$ alkoxy-$C_1$-$C_6$ akleneoxy group; and c and d are integers having a ratio of from 1:3 to 3:1.

62. The method of claim 61, wherein after said washing step, said first and second metals are present in a concentration of less than 100 parts per million Group IVA atoms in said hydrogenated Group IVA compound.

63. The method of claim 62, wherein after said washing step, said first and second metals are present in a concentration of less than 10 parts per million Group IVA atoms in said hydrogenated Group IVA compound.

64. The method of claim 63, wherein after said washing step, said first and second metals are present in a concentration of less than 1 part per million Group IVA atoms in said hydrogenated Group IVA compound.

65. The method of claim 39, further comprising the step of reacting a compound of the formula $A_{x'}R_{y'}$ with HX and a Lewis acid to form said compound of the formula $A_xX_y$, wherein x' is from 3 to 12, y' is from x' to (2x'+2), and R is an alkyl group or an aryl group which may be substituted with alkyl, alkoxy, aryl, aralkyl, halogen and/or nitro groups.

66. The method of claim 65, wherein R comprises a phenyl group.

67. The method of claim 66, wherein said Lewis acid comprises a compound of the formula $M^3_pX_q$, where $M^3$ comprises a member selected from the group consisting of transition metals and Group IIIA elements, p is 1 or 2, and q is any integer up to the number of ligand binding sites available on the p instances of $M^3$.

68. The method of claim 67, wherein $M^3$ comprises Al, and X comprises Cl or Br.

69. The method of claim 65, further comprising the step of reacting a compound of the formula $A_uR_vX_w$ with a reducing agent to form said compound of the formula $A_{x'}R_{y'}$, wherein x' is from 3 to 12, y' is from x' to (2x'+2), u is at least 1, v is at least 1, and w is any integer up to (2u+2−v).

70. The method of claim 69, wherein A is Si, u is 1, v is 1 or 2, and w is (4−v).

71. The method of claim 69, wherein R comprises a phenyl group.

72. The method of claim 69, wherein said reducing agent comprises an alkali metal.

73. The method of claim 38, further comprising the step of drying said hydrogenated Group IVA compound.

74. The method of claim 38, further comprising the step of distilling said hydrogenated Group IVA compound.

75. The method of claim 38, wherein separating said washing composition containing metal contaminants comprises decanting said washing composition containing metal contaminants from said hydrogenated Group IVA compound.

* * * * *